United States Patent
Ahn et al.

(10) Patent No.: US 10,986,342 B2
(45) Date of Patent: Apr. 20, 2021

(54) 360-DEGREE IMAGE ENCODING APPARATUS AND METHOD, AND RECORDING MEDIUM FOR PERFORMING THE SAME

(71) Applicants: Foundation for Research and Business, Seoul National University of Science and Technology, Seoul (KR); Industry-University Cooperation Foundation Korea Aerospace University, Goyang-si (KR)

(72) Inventors: Heejune Ahn, Seoul (KR); Myeongjin Lee, Seoul (KR)

(73) Assignees: Foundation for Research and Business, Seoul National University of Science and Technology, Seoul (KR); Industry-University Cooperation Foundation Korea Aerospace University, Goyang-si (KR)

( * ) Notice: Subject to any disclaimer, the term of this patent is extended or adjusted under 35 U.S.C. 154(b) by 0 days.

(21) Appl. No.: 16/621,626

(22) PCT Filed: Nov. 23, 2017

(86) PCT No.: PCT/KR2017/013414
§ 371 (c)(1),
(2) Date: Dec. 11, 2019

(87) PCT Pub. No.: WO2019/054561
PCT Pub. Date: Mar. 21, 2019

(65) Prior Publication Data
US 2020/0107022 A1    Apr. 2, 2020

(30) Foreign Application Priority Data

Sep. 15, 2017 (KR) .......................... 10-2017-0118410

(51) Int. Cl.
*H04N 19/105* (2014.01)
*H04N 19/124* (2014.01)
(Continued)

(52) U.S. Cl.
CPC ......... *H04N 19/124* (2014.11); *H04N 19/105* (2014.11); *H04N 19/117* (2014.11);
(Continued)

(58) Field of Classification Search
None
See application file for complete search history.

(56) References Cited

U.S. PATENT DOCUMENTS 9,237,357 B2 *  1/2016  Park .................... H04N 19/59
9,911,179 B2 *  3/2018  Su ....................... H04N 19/117
(Continued)

FOREIGN PATENT DOCUMENTS

KR    10-1999-0076787 A    10/1999
KR        10-0728222 B1     6/2007
(Continued)

OTHER PUBLICATIONS

Miska M. Hannuksela et al., "SEI messages for omnidirectional video", Joint Collaborative Team on Video Coding (JCT-VC) of ITU-T SG 16 WP 3 and ISO/IEC JTC 1/SC 29/WG 11 26th Meeting, Jan. 12-20, 2017, Geneva, CH.
(Continued)

*Primary Examiner* — Shadan E Haghani
(74) *Attorney, Agent, or Firm* — Novick, Kim & Lee, PLLC; Sang Ho Lee

(57) ABSTRACT

Provided is a 360-degree image encoding apparatus and method, and a recording medium for performing the same function. The 360-degree image encoding apparatus divides an input image to be encoded into a plurality of regions in a vertical direction and encodes the divided regions while changing resolutions thereof so that all regions have the same resolution to maintain pixel continuity among the regions when a predictive image is generated and the regions have resolutions changed according to the degree of distortion of the regions when a residue image is encoded.

8 Claims, 9 Drawing Sheets

(51) Int. Cl.
  *H04N 19/117* (2014.01)
  *H04N 19/119* (2014.01)
  *H04N 19/172* (2014.01)
  *H04N 19/53* (2014.01)
  *H04N 19/597* (2014.01)

(52) U.S. Cl.
  CPC ......... *H04N 19/119* (2014.11); *H04N 19/172* (2014.11); *H04N 19/53* (2014.11); *H04N 19/597* (2014.11)

(56) References Cited

U.S. PATENT DOCUMENTS

| | | | |
|---|---|---|---|
| 10,063,869 B2 * | 8/2018 | Lee | H04N 19/159 |
| 2016/0142697 A1 | 5/2016 | Budagavi et al. | |
| 2019/0297339 A1 * | 9/2019 | Hannuksela | H04N 19/176 |

FOREIGN PATENT DOCUMENTS

| | | |
|---|---|---|
| KR | 10-2013-0105870 A | 9/2013 |
| KR | 10-2016-0079357 A | 7/2016 |
| WO | 2012/177015 A2 | 12/2012 |
| WO | 2013-133639 A1 | 9/2013 |
| WO | 2016-076680 A1 | 5/2016 |

OTHER PUBLICATIONS

Jianle Chen et al., "SHVC Test Model 10 (SHM 10) Introduction and Encoder Description", Joint Collaborative Team on Video Coding (JCT-VC) of ITU-T SG 16 WP 3 and ISO/IEC JTC 1/SC 29/WG 11 21st Meeting, Jun. 19-26, 2015, Warsaw, PL.

Ye-Kui Wang, "Omnidirectional media format SEI messages" Joint Collaborative Team on Video Coding (JCT-VC) of ITU-T SG 16 WP 3 and ISO/IEC JTC 1/SC 29/WG 11 28th Meeting: Jul. 15-21, 2017, Torino, IT.

* cited by examiner

| projections | 3D Model | 2D Projection |
|---|---|---|
| Equirectangular | | |
| Tetrahedron (4 faces) | | |
| Cube (6 faces) | | |
| Octahedron (8 faces) | | |
| Dodecahedron (12 faces) | | |
| Icosahedron (20 faces) | | |

FIG. 3

360-DEGREE IMAGE ENCODING APPARATUS AND METHOD, AND RECORDING MEDIUM FOR PERFORMING THE SAME

TECHNICAL FIELD

This disclosure relates to a 360-degree image encoding apparatus and method, and a recording medium for performing the same.

BACKGROUND ART

In general, a video has a very large information capacity, which makes it difficult to transmit or store data in a network channel having a limited bandwidth.

Accordingly, the technology for compressing a video into smaller bits of information has been actively studied, and the standard methods such as MPEG-1, MPEG-2, MPEG-4, H.263, H.264 (MPEG-4/AVC) and H.265 (HEVC) are established and used.

The existing video compression techniques described above have all been developed on the assumption that an input image has a rectangular linear projection format.

The video compression performance is highly dependent on the information prediction techniques for predicting pixel values and the difference signal approximating techniques after pixels prediction.

The technique for predicting a value of pixel includes an inter-image prediction encoding method in which a difference value between a predictive block and a current block is encoded by predicting the current block in a current screen with reference to at least one previous or subsequent pictures as shown in FIG. 1, and an intra-image prediction encoding method in which a prediction block is generated by predicting a pixel of a current block using pixels of blocks that have been previously encoded and decoded to be restored in the current screen where encoding is currently performed and then a difference value from the current block is encoded as shown in FIG. 2.

In both of the above methods, prediction is performed based on a reference frame that is reconstructed by decoding at a previous video bit string in an encoder and a decoder. As the reference frame, not only a previous picture (t−1) or a later picture (t+1) used for reference but also an already encoded region of a current picture (t) may be stored and used for prediction.

Here, in consideration of prediction efficiency and system complexity, a two-dimensional planar movement is assumed, and only prediction from pixels within a certain distance is put into consideration. Thus, when constructing a reference frame used for prediction, the prediction may be performed more effectively when used to predict a distance between a pixel and a pixel used for prediction is smaller and more continuous spatially.

Meanwhile, the virtual reality (VR) provides a user with a three-dimensional virtual world created by a computer, which is similar to the real world. If a user manipulates an input means that may interact with the virtual world in real time, the VR provides the five senses corresponding to the user manipulation, so that the user may have a sensory experience similar to reality.

Here, visual information is the most important means for a person to acquire situational information. An existing video provides only a fixed view, but a 360-degree VR imaging method provides an image in all directions or a wide view that is greater than the vision range of human eyes and also allows a viewer to select information at a desired time. As described above, the 360-degree VR imaging method is a representative method of implementing the VR.

The 360-degree VR, which overcomes the limitations of space and time, may provide various experiences such as VR travel experiences, VR exhibition hall service, VR shopping malls, VR theme parks and VR education services in accordance with the development of technology.

In addition, with the development of camera technology and content delivery technology, the production and distribution of VR content has greatly increased, and 360-degree VR video service is also provided at YouTube, Facebook and the like.

A 360-degree VR image may be obtained by photographing images using a plurality of cameras with a limited field of view (FOV) and then composing the photographed images with software or hardware.

In the existing method for compressing a 360-degree image using the video compression technique described above, 360-degree visual information is projected to a two-dimensional rectangular plane using a polar coordinate projection method such as ERP (Equi-Rectangular Projection) and EAP (Equal-Area Projection). Alternatively, a 360-degree image is projected to one two-dimensional planar image or a plurality of two-dimensional planar images as shown in FIG. 3 using a three-dimensional polyhedral planar projection method such as Cube (CubeMap Projection), OHP (OctaHedron Projection), ISP (IcoSahedron Projection) or the like. Then, the projected image is mapped to a two-dimensional rectangular plane and compressed using an existing video compression technique.

As described above, the spherical 360-degree image information is projected using a polar coordinate projection method such as ERP and EAP, or CMP, OHP, ISP and the like for projecting the information to several two-dimensional planar images.

Among them, the polar coordinate projection method is frequently utilized.

At this time, in the ERP method among the polar coordinate projection methods, as shown in FIG. 4, an area (resolution) of an upper region or a lower region whose vertical angle is close to +/−90 degrees is increased then an area (resolution) of an actual spherical phase is distorted. That is, the number of pixels allocated to an object located in the upper region or the lower region is greater than the number of pixels allocated to an object located in a middle region.

For this reason, if the existing video compression method is applied identically to the upper region or the lower region which is more exaggerated than the actual shape, the upper region or the lower region is compressed to have a relatively excessive quality compared to other regions, thereby reducing overall compression efficiency.

In order to solve this problem, conventionally, as shown in FIG. 5, a two-dimensional planar image is divided into three regions (an upper region, a middle region and a lower region), and the upper region and the lower region are rearranged to reduce the resolution thereof, and then the two-dimensional planar image is compressed using the existing video compression technique.

However, if the two-dimensional planar image is rearranged and compressed using the existing video compression technique, the correlation of the image information between the rearranged upper region and the rearranged lower region, the correlation of the image information between the rearranged upper region and the middle region and the correlation of the image information between the rearranged lower region and the middle region are deteriorated, thereby lowering the accuracy of prediction. As a result, there is a region where the prediction is not performed well.

Thus, a Difference Between the Original Pixel Value and the Predicted Pixel Value is Increased, Consequently Deteriorating the Compression Efficiency.

RELATED LITERATURES (Patent-Literature) Korean Unexamined Patent Publication No. 10-2017-0084275 (published on Jul. 19, 2017)
(Non-patent Literature) Youvalari, R. G., Aminlou, A., & Hannuksela, M. M. (2016, December). Analysis of regional down-sampling methods for coding of omnidirectional video. In Picture Coding Symposium (PCS), 2016 (pp. 1-5). IEEE.

DISCLOSURE

Technical Problem

This disclosure is designed to solve the above problem, and the present disclosure is directed to providing a 360-degree image encoding apparatus and method, which divides an input image to be encoded into a plurality of regions in a vertical direction and encodes the divided regions while changing resolutions thereof so that all regions have the same resolution to maintain pixel continuity among the regions when a predictive image is generated and the regions have resolutions changed according to the degree of distortion of the regions when a residue image is encoded.

Technical Solution

In one general aspect of the present disclosure, there is provided a 360-degree image encoding apparatus for encoding a 360-degree image projected to a single plane and developed thereto, comprising: a first down-sampling unit configured to divide a current frame image serving as an encoding target image into a 2n+1 number of regions in a vertical direction, maintain a resolution of a middle region among the divided regions and perform down-sampling to each remaining region to lower a resolution thereof; a first up-sampling unit configured to perform up-sampling to the down-sampled remaining region to raise a resolution of the remaining region to the same level as the middle region; a prediction unit configured to generate a predictive image by performing inter- or intra-image predictions using the up-sampled current frame image and a reference frame image; a second down-sampling unit configured to divide the predictive image into a 2n+1 number of regions in the vertical direction, maintain a resolution of a middle region among the divided regions and perform down-sampling to each remaining region to lower a resolution thereof; a subtraction unit configured to generate a residue image between the current frame image down-sampled by the first down-sampling unit and the predictive image down-sampled by the second down-sampling unit; a conversion unit configured to convert the residue image into a frequency region; a quantization unit configured to quantize the data converted into the frequency region; and an encoding unit configured to encode the quantized result value.

In an embodiment of the present disclosure, the 360-degree image encoding apparatus may further comprise: a de-quantization unit configured to restore the value of the frequency region by de-quantizing the result value quantized by the quantization unit; an inversion unit configured to restore the residue image by inverting the value of the frequency region restored by the de-quantization unit; an addition unit configured to generate a restored image of an input image by adding the restored residue image to the predictive image down-sampled by the second down-sampling unit; a second up-sampling unit configured to raise the resolution of the remaining region to the same level as the middle region by performing up-sampling to the remaining region, excluding the middle region, of the restored image generated by the addition unit; and a memory unit configured to store the restored image up-sampled by the second up-sampling unit as the reference frame image.

In an embodiment of the present disclosure, when performing down-sampling to the remaining region, excluding the middle region, the first down-sampling unit may perform down-sampling only in the horizontal direction, and a down-sampling ratio applied to each region may be differentially determined according to the degree of distortion exhibited in each region in the horizontal direction.

In an embodiment of the present disclosure, the first up-sampling unit may perform up-sampling to each region according to an up-sampling ratio that is set reversely to a down-sampling ratio used when the first down-sampling unit performs down-sampling to the remaining region, excluding the middle region.

In an embodiment of the present disclosure, the second down-sampling unit may perform down-sampling to each region according to a down-sampling ratio identical to a down-sampling ratio used when the first down-sampling unit performs down-sampling to the remaining region, excluding the middle region.

In an embodiment of the present disclosure, the second up-sampling unit may perform up-sampling to each region according to an up-sampling ratio that is set reversely to a down-sampling ratio that is used when the first down-sampling unit performs down-sampling to the remaining region, excluding the middle region.

In an embodiment of the present disclosure, a method and filter coefficient of a down-sampling filter used by the first down-sampling unit and a method and filter coefficient of an up-sampling filter used by the first up-sampling unit may be included in a video bit stream and transferred to an image decoding device, or be used with preset values according to mutual promise.

In another aspect of the present disclosure, there is also provided a 360-degree image encoding method for encoding a 360-degree image projected to a single plane and developed thereto, comprising: a first down-sampling step of dividing a current frame image serving as an encoding target image into a 2n+1 number of regions in a vertical direction, maintaining a resolution of a middle region among the divided regions and performing down-sampling to each remaining region to lower a resolution thereof; a first up-sampling step of performing up-sampling to the down-sampled remaining region to raise a resolution of the remaining region to the same level as the middle region; a prediction step of generating a predictive image by performing inter-image prediction or intra-image prediction using the up-sampled current frame image and a reference frame image; a second down-sampling step of dividing the predictive image into a 2n+1 number of regions in the vertical direction, maintaining a resolution of a middle region among the divided regions and performing down-sampling to each remaining region to lower a resolution thereof; a subtraction step of generating a residue image between the current frame image down-sampled in the first down-sampling step and the predictive image down-sampled in the second down-sampling step; a conversion step of converting the residue image into a frequency region; a quantization step of quantizing the data converted into the frequency region; and an encoding step of encoding the quantized result value.

In an embodiment of the present disclosure, the 360-degree image encoding method may further comprise: a de-quantization step of restoring the value of the frequency region by de-quantizing the quantized result value; an inversion step of restoring the residue image by inverting the value of the restored frequency region; an addition step of generating a restored image of an input image by adding the restored residue image to the predictive image down-sampled in the second down-sampling step; a second up-sampling step of raising the resolution of the remaining region to the same level as the middle region by performing up-sampling to the remaining region, excluding the middle region, of the restored image; and a memorizing step of storing the restored image up-sampled in the second up-sampling step as the reference frame image.

Advantageous Effects

In the 360-degree image encoding apparatus and method and the recording medium for performing the same according to the present disclosure, an input image to be encoded is divided into a plurality of regions in a vertical direction, and the divided regions are encoded while changing resolutions thereof so that all regions have the same resolution to maintain pixel continuity among the regions when a predictive image is generated and the regions have resolutions changed according to the degree of distortion of the regions when a residue image is encoded. In this case, since the number of pixels used for compression is decreased, it is possible to reduce the time consumed for compressing an image and therefore enhance the compression efficiency.

DESCRIPTION OF DRAWINGS

FIG. 3 is a diagram exemplarily showing projection formats.

< Reference Signs >

Figure 1:
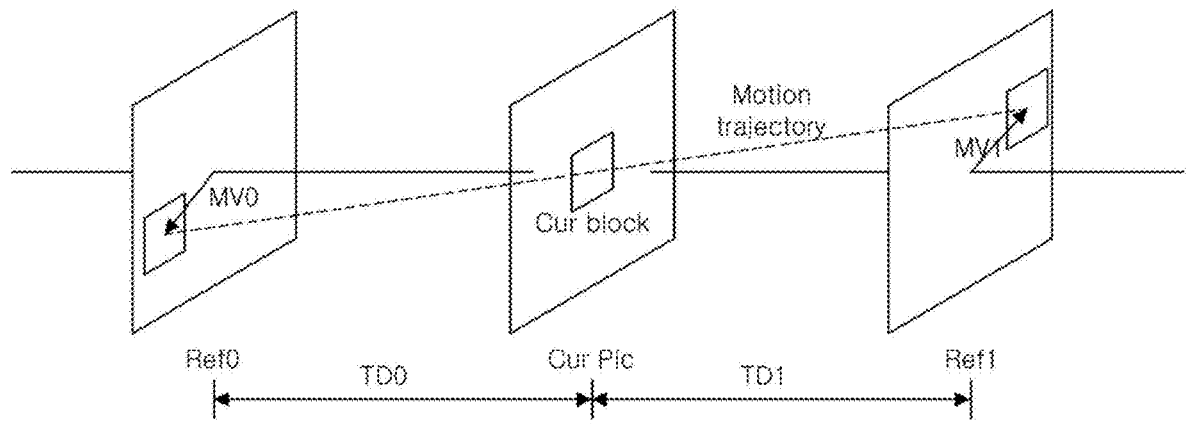
FIG. 1 is a diagram for illustrating an inter-image prediction encoding method.
Figure 2:
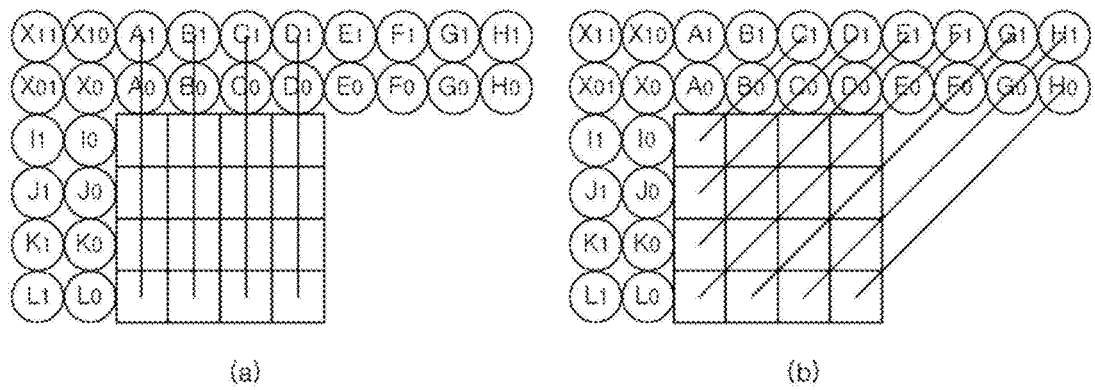
FIG. 2 is a diagram for illustrating an intra-image prediction encoding method.
Figure 2:
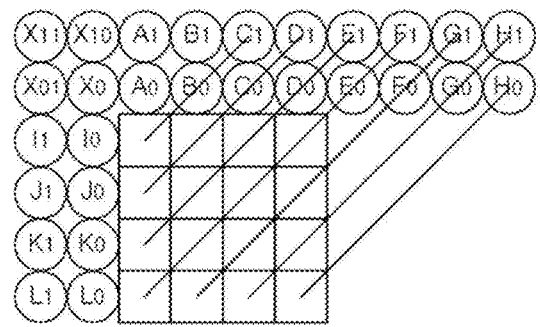
Figure 2:
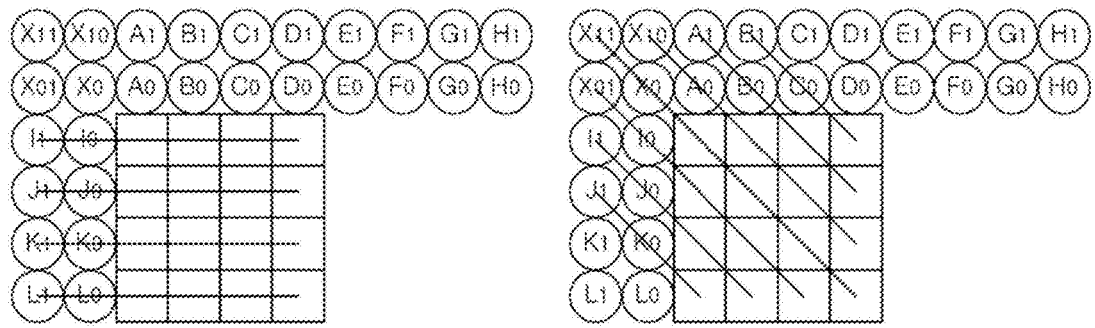
Figure 2:
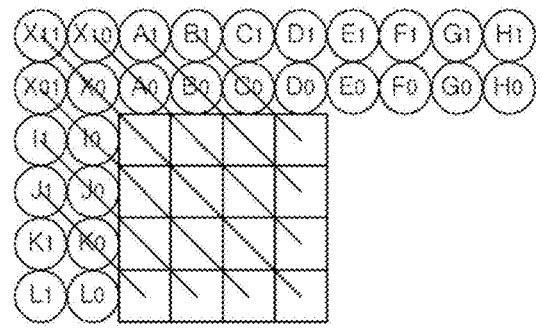
Figure 4:
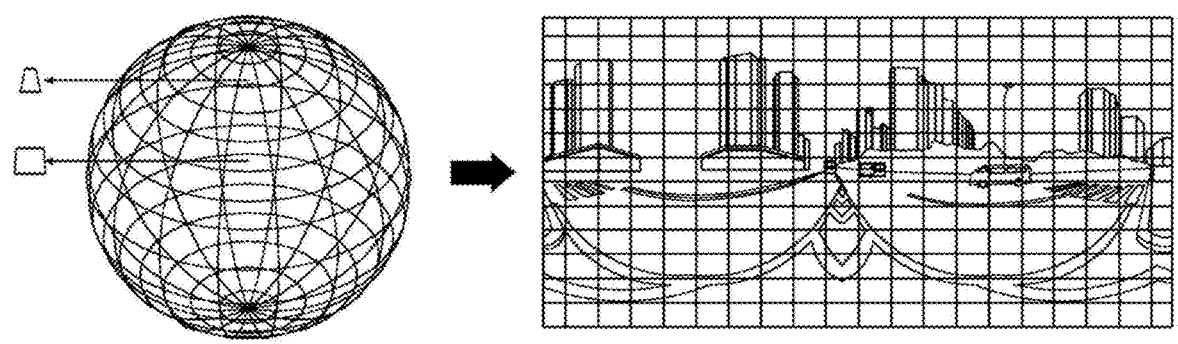
FIG. 4 is a diagram exemplarily showing a 360-degree image projected by a polar coordinate projection method and developed into a two-dimensional planar image.
Figure 5:
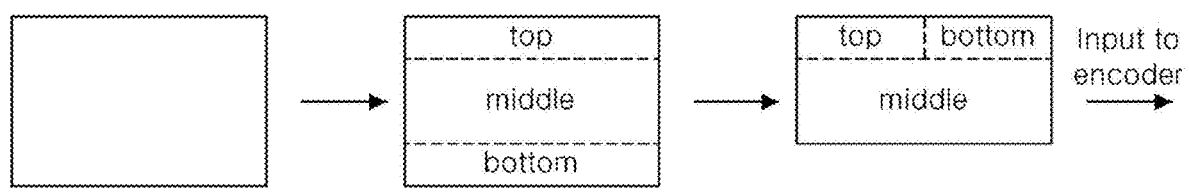
FIG. 5 is a diagram for illustrating a conventional 360-degree image encoding method.

| | |
|---|---|
| 110: image input unit | 115: first down-sampling unit |
| 120: first up-sampling unit | 125: subtraction unit |

-continued

< Reference Signs >

| | |
|---|---|
| 130: conversion unit | 135: quantization unit |
| 140: entropy encoding unit | 145: de-quantization unit |
| 150: inversion unit | 155: addition unit |
| 160: second up-sampling unit | 165: memory unit |
| 170: prediction unit | 175: second down-sampling unit |
| 180: control unit | |

BEST MODE

The present disclosure will be described in detail with reference to the accompanying drawings which illustrate, by way of example, specific embodiments in which the present disclosure may be implemented. These embodiments are described in sufficient detail to enable those skilled in the art to implement the present disclosure. It should be understood that various embodiments of the present disclosure are different from each other but need not be mutually exclusive. For example, specific features, structures and characteristics described herein may be implemented in other embodiments without departing from the scope of the present disclosure in connection with one embodiment. It should also be understood that the position or arrangement of individual components in each embodiment may be varied without departing from the scope of the present disclosure. Therefore, the following detailed description is not taken to limit the present disclosure, and the scope of the present disclosure is limited only by the appended claims, along with the full scope of equivalents to which such claims are entitled. In the drawings, like reference signs refer to the same or similar functions throughout several aspects.

A 360-degree image encoding apparatus and method, and a recording medium for performing the same according to an embodiment of the present disclosure will be described in detail with reference to the accompanying drawings.

Figure 6:
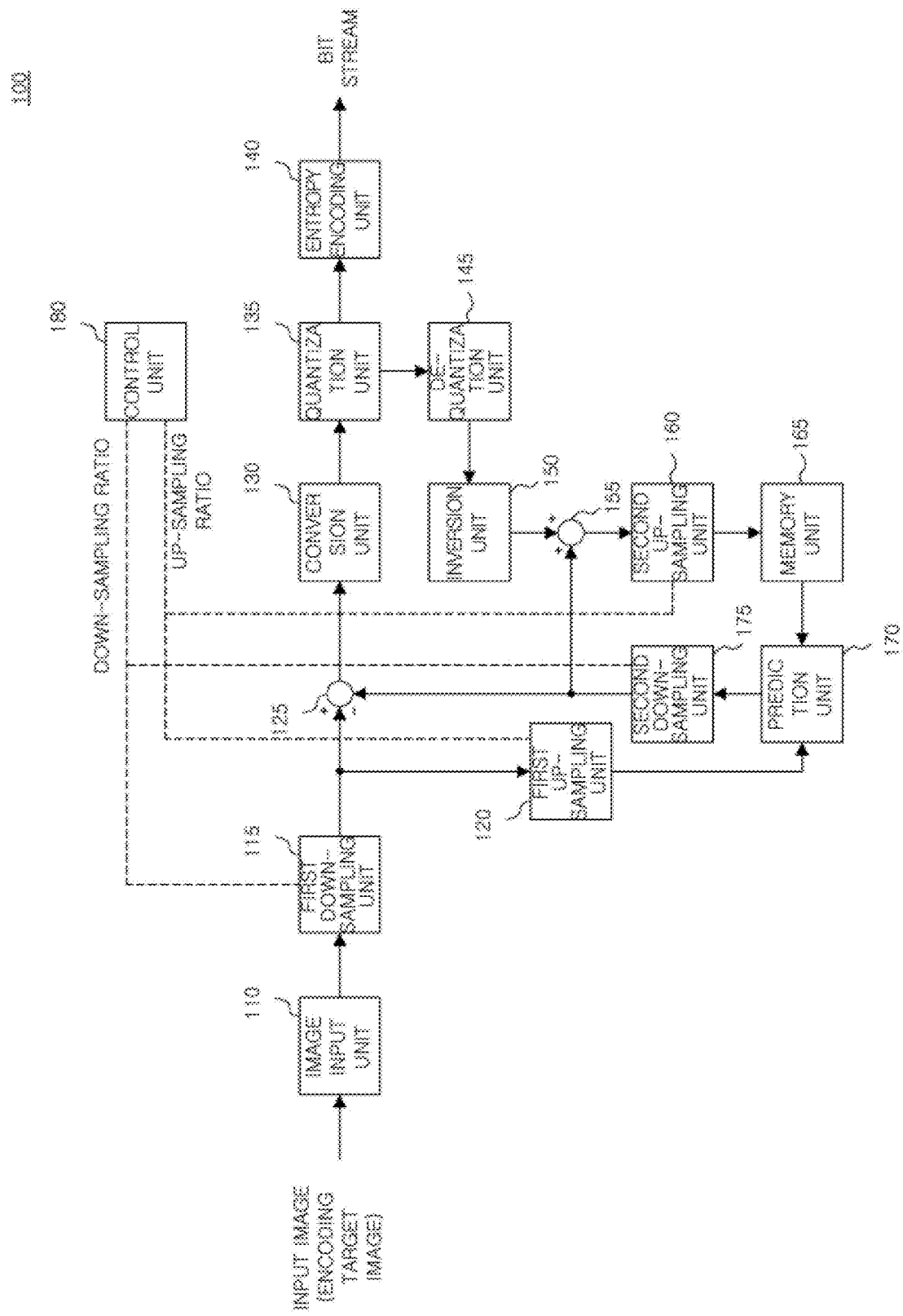
FIG. 6 is a diagram schematically showing a 360-degree image encoding apparatus according to an embodiment of the present disclosure.

FIG. 6 is a diagram schematically showing a 360-degree image encoding apparatus according to an embodiment of the present disclosure.

In FIG. 6, an image input unit 110 receives a 360-degree image that is projected using a polar coordinate projection method such as ERP and EAP and developed into a two-dimensional planar image.

Figure 7:
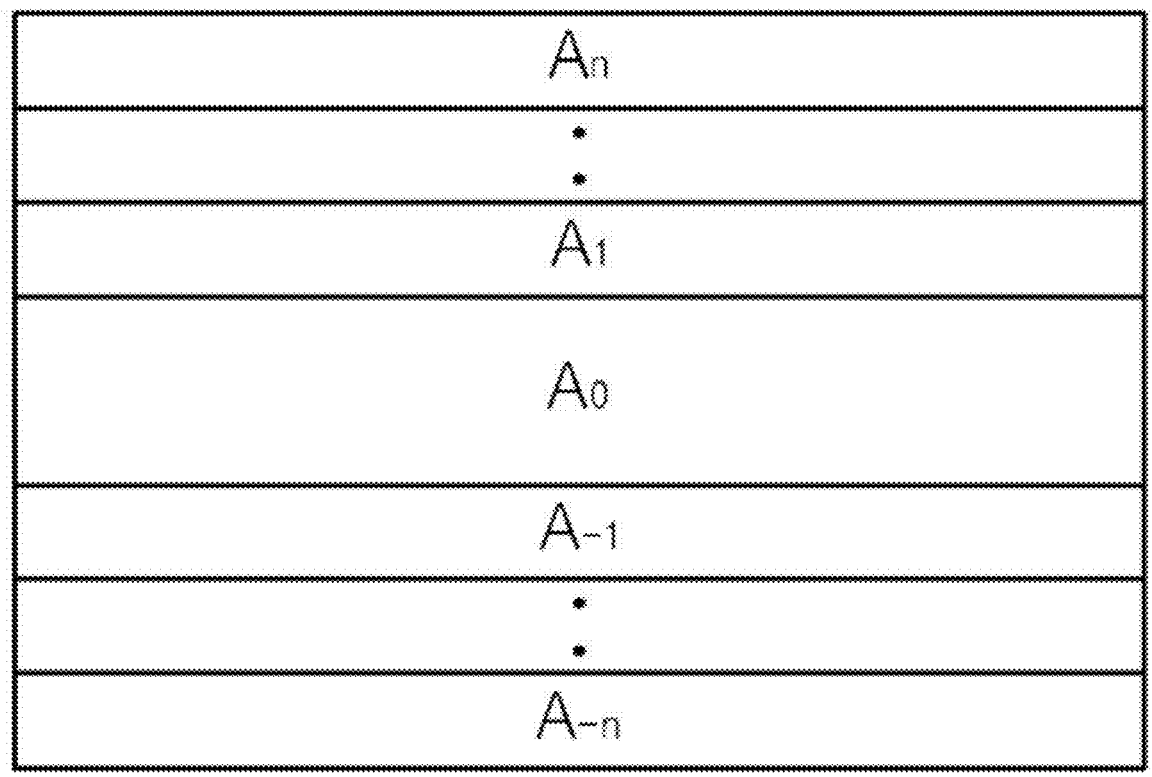
FIGS. 7 to 10 are diagrams for illustrating operations of the 360-degree image encoding apparatus according to an embodiment of the present disclosure.
Figure 8:
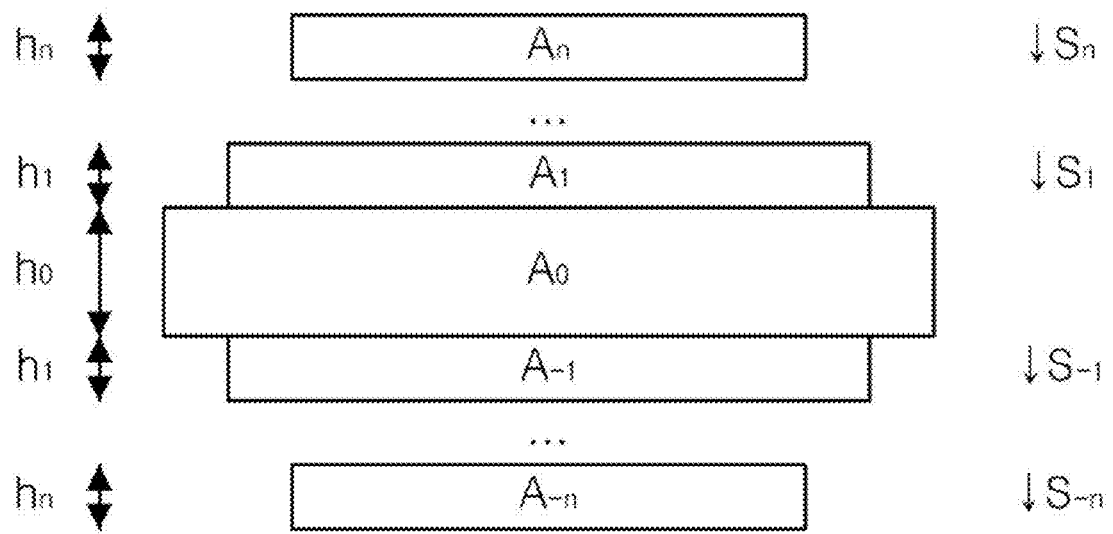

A first down-sampling unit 115 divides a current frame image, which is an encoding target image, received from the image input unit 110 into a 2n+1 number (for example, 3, 5, 7, etc.) of regions in the vertical direction as shown in FIG. 7, maintains a resolution of a middle region $A_0$ located in the middle among the divided regions, performs down-sampling to remaining regions $A_{-n}, \ldots, A_{-1}, A_1, \ldots, A_n$, respectively, to lower a resolution thereof as shown in FIG. 8, and applies a current frame image obtained by down-sampling the remaining region, excluding the middle region, to a subtraction unit 125 and a first up-sampling unit 120, respectively.

When performing down-sampling to the remaining region, excluding the middle region, to lower the resolution of the corresponding region, the first down-sampling unit 115 preferably maintains the resolution of the vertical direction, where distortion is not seriously generated, in the same level as the resolution of the input image in the vertical direction, as shown in FIG. 8.

The resolution $h_{-n}, \ldots, h_{-1}, h_1, \ldots, h_n$ of each region in the vertical direction may be set in consideration of a coding unit of a video codec, and this information may be included in an image compression bit string and then transferred.

Meanwhile, for the horizontal direction where distortion is generated more than the vertical direction, the down-sampling is performed to lower the resolution in the horizontal direction as shown in FIG. 8.

At this time, a down-sampling ratio that determines how much the resolution of the horizontal direction is lowered may be differentially determined in consideration of the degree of distortion exhibited in the horizontal direction of each region. As being closer to an upper side or a lower side where the degree of distortion is greater, namely as the vertical angle is closer to +/−90 degrees, the down-sampling ratio may be determined to be a larger value, and this information may be included in the image compression bit string and transmitted.

For example, assuming that the down-sampling ratio is 25:20 between the region $A_1$ and the region $A_{-1}$, for example, the down-sampling ratio between the region $A_n$ and the region $A_{-n}$ where distortion is more serious than the region $A_1$ and the region $A_{-1}$ may be, for example, 25:10.

A method and filter coefficient of a down-sampling filter used in the first down-sampling unit 115 may be included in a video bit stream and transmitted to the image decoding device, or preset values may be used according to mutual promise.

The first up-sampling unit 120 performs up-sampling again to the current frame image received from the first down-sampling unit 115 and applies to a prediction unit 170 in order to generate a predictive image using the current frame image obtained by down-sampling the remaining region, excluding the middle region, by the first down-sampling unit 115. That is, up-sampling is performed at a predetermined up-sampling ratio to the remaining region, excluding the middle region, of the current frame image applied from the first down-sampling unit 115, thereby raising the resolution of each remaining region to the same level as the middle region.

A method and filter coefficient of an up-sampling filter used in the first up-sampling unit 120 may be included in a video bit stream and transmitted to the image decoding device, or preset values may be used according to mutual promise.

An up-sampling ratio used in the first up-sampling unit 120 described above is preferably set reversely to the down-sampling ratio set for each divided region to the first down-sampling unit 115.

For example, if the first down-sampling unit 115 performs down-sampling to the region $A_1$ and the region $A_{-1}$ at a ratio of 25:20 by, the first up-sampling unit 120 performs up-sampling to the region $A_1$ and the region $A_{-1}$ at a ratio of 20:25.

Since the current frame image up-sampled by the first up-sampling unit 120 is an image obtained by up-sampling the image down-sampled by the first down-sampling unit 115, the current frame image is not identical to the input image (the encoding target image) received through the image input unit 110.

The subtraction unit 125 receives the encoding target image (the current frame image) obtained by performing down-sampling to the remaining regions, excluding the middle region, by the first down-sampling unit 115, receives the predictive image obtained by performing down-sampling to the remaining regions, excluding the middle region, by the second down-sampling unit 175, then subtracts the predictive image obtained by performing down-sampling to the remaining regions, excluding the middle region, by the second down-sampling unit 175 from the current frame image obtained by performing down-sampling to the remaining regions, excluding the middle region, by the first down-sampling unit 115 to generate a residue image between the current frame image obtained by performing down-sampling to the remaining regions, excluding the middle region, and the predictive image obtained by performing down-sampling to the remaining regions, excluding the middle region, and applies the generated residue image to a conversion unit 130.

The conversion unit 130 converts the residue image generated by the subtraction unit 125 from a spatial region into a frequency region.

The conversion unit 130 may convert the residue image into a frequency region by using a technique of transforming the image signal of a spatial axis to a frequency axis, like hadamard transform, discrete cosine transform and discrete sine transform.

A quantization unit 135 quantizes the transformed data (frequency coefficient) provided from the conversion unit 130. That is, the quantization unit 135 calculates a quantization result value by approximating the frequency coefficients, which are data converted by the conversion unit 130, by a quantization step-size.

An entropy encoding unit 140 may generate a bit stream by entropy-encoding the quantization result value calculated by the quantization unit 135 and entropy-encode index information, motion vector information or the like of a reference frame, which is information necessary for decoding an image.

The image encoded into a bit stream by the entropy encoding unit 140 as described above is transmitted to an image decoding device through a wired/wireless communication network such as the Internet, a local area wireless communication network, a wireless LAN network, a WiBro network and a mobile communication network or through various communication interfaces such as a cable and a universal serial bus (USB).

The image decoding device, which receives the bit stream from the image encoding device, decodes the bit stream to generate a restored image.

A de-quantization unit 145 de-quantizes the quantization result value calculated by the quantization unit 135. That is, the de-quantization unit 145 restores the value (frequency coefficient) of the frequency region from the quantization result value.

An inversion unit 150 restores the residue image by converting the value (frequency coefficient) of the frequency region received from the de-quantization unit 145 from the frequency region to the spatial region.

Figure 9:
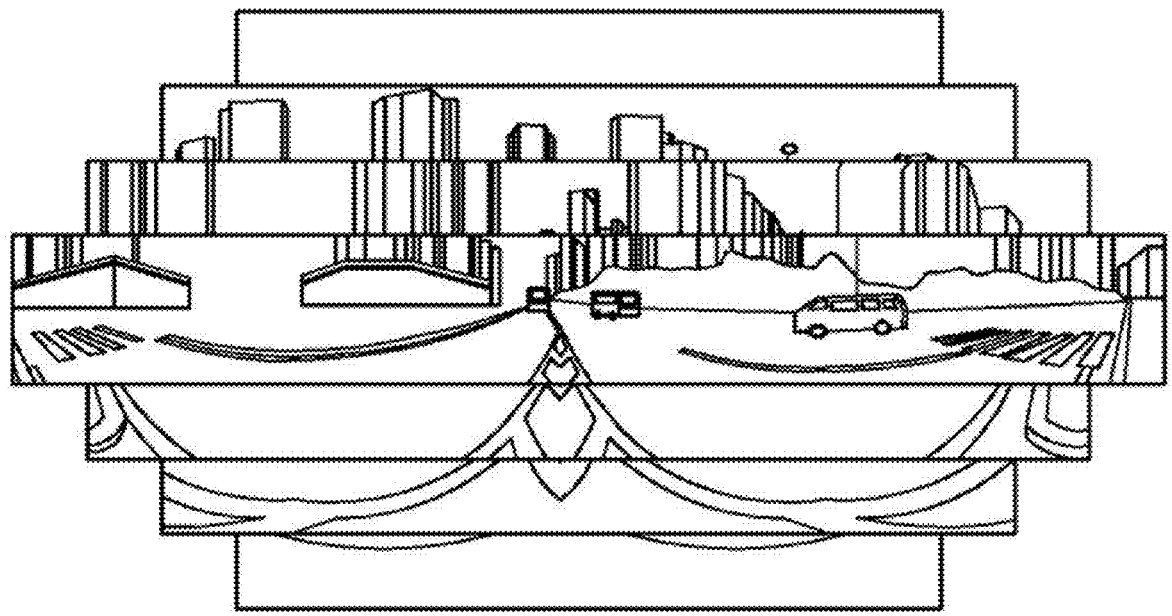

An addition unit 155 adds the predictive image applied from the second down-sampling unit 175, namely the predictive image obtained by down-sampling the remaining region excluding the middle region, to the residue image restored by the inversion unit 150 to generate a restored image of the input image as shown in FIG. 9.

The restored image stored in the addition unit 155 is the same as the image that the subtraction unit 125 receives from the first down-sampling unit 115.

Figure 10:
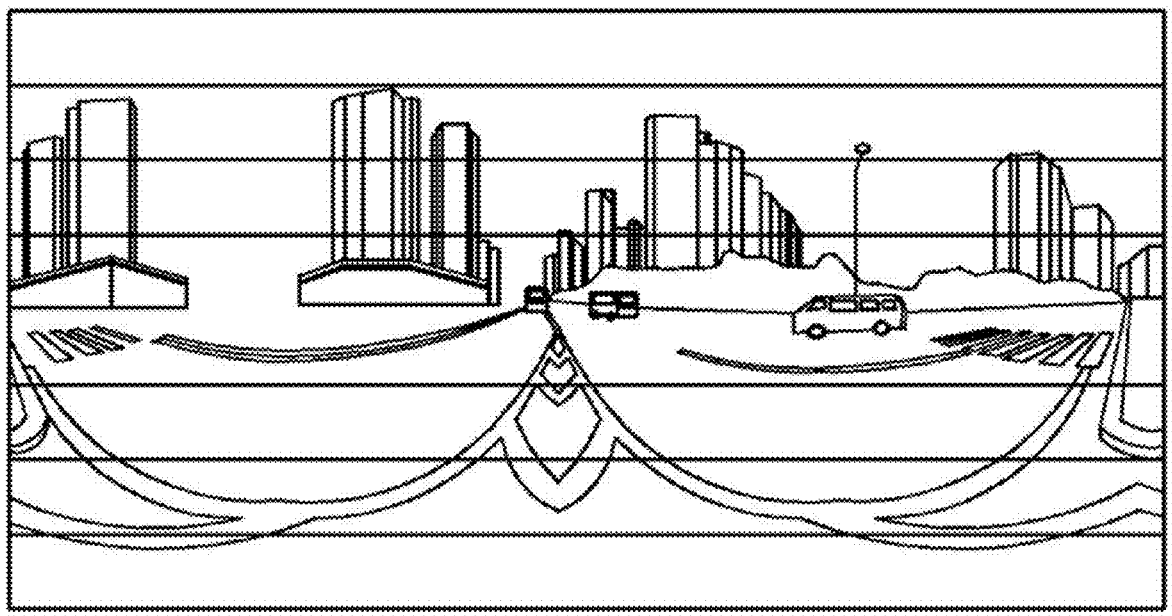

The second up-sampling unit 160 performs up-sampling to the remaining region (the down-sampled region), excluding the middle region, of the restored image generated by the addition unit 155 at a predetermined up-sampling ratio to raise the resolution of each remaining region to the same level as the middle region as shown in FIG. 10.

Here, the up-sampling ratio used in the second up-sampling unit 160 is preferably set reversely to the down-sampling ratio set for each divided region in the first down-sampling unit 115.

For example, if the first down-sampling unit 115 performs down-sampling to the region $A_1$ and the region $A_{-1}$ at a ratio of 25:20, the second up-sampling unit 160 performs up-sampling to the region $A_1$ and the region $A_{-1}$ at a ratio of 20:25.

The memory unit 165 stores the restored image up-sampled by the second up-sampling unit 160.

The up-sampled restored image stored in the memory unit 165 is a reference frame image for the current frame that is an encoding target image.

The prediction unit 170 generates a predictive image of the current frame image by using the reference frame image stored in the memory unit 165 and the current frame image obtained by up-sampling the remaining region, excluding the middle region, applied from the first up-sampling unit 120, and applies the generated predictive image to the second down-sampling unit 175.

The prediction unit 170 may generate the predictive image for the current frame image by performing inter- or intra-image predictions.

The prediction unit 170 may include an inter-image prediction unit for generating a predictive image in the current frame image with reference to at least one previous or subsequent frame image, and an intra-image prediction unit for generating a predictive image by using pixels of restored images previously encoded and decoded in the current frame image.

The second down-sampling unit 175 divides the predictive image generated by the prediction unit 170 into a 2n+1 number (for example, 3, 5, 7, etc.) of regions in the vertical direction, maintains a resolution of a middle region $A_0$ located in the middle among the divided regions, and performs down-sampling to remaining regions, respectively, to lower a resolution thereof.

When performing down-sampling to the remaining region, excluding the middle region, to lower the resolution of the corresponding region, the second down-sampling unit 175 preferably lowers the resolution of each remaining region according to the same down-sampling ratio as the first down-sampling unit 115.

For example, if the first down-sampling unit 115 performs down-sampling to the region $A_1$ and the region $A_{-1}$ at a ratio of 25:20, the second down-sampling unit 175 performs down-sampling to the region $A_1$ and the region $A_{-1}$ at a ratio of 25:20.

The control unit 180 controls the first down-sampling unit 115 and the second down-sampling unit 175 to perform down-sampling according to the predefined down-sampling ratio for each region and controls the first up-sampling unit 120 and the second up-sampling unit 160 to perform up-sampling according to the predefined up-sampling ratio for each region.

Figure 11:
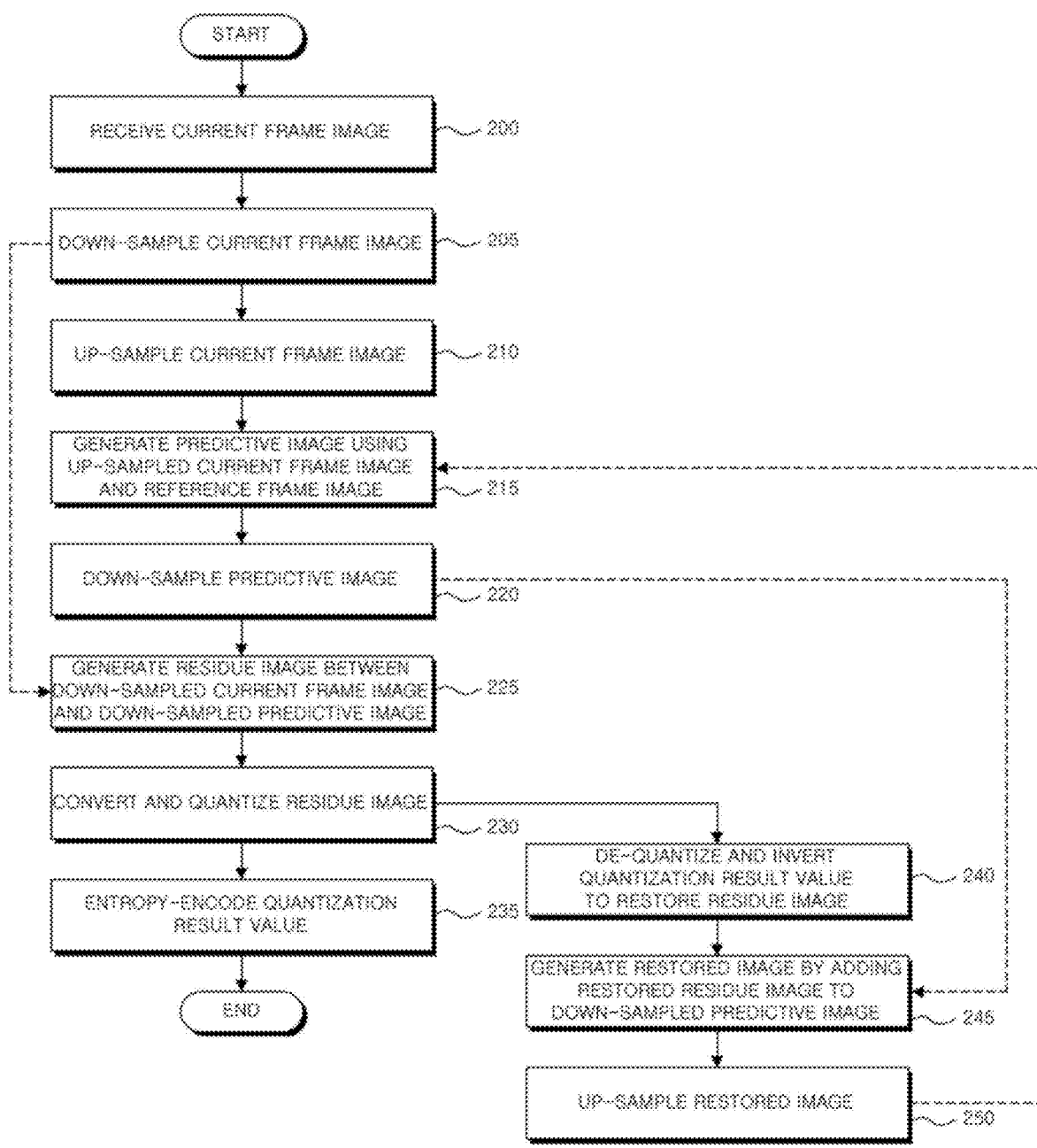
FIG. 11 is a flowchart for illustrating a 360-degree image encoding method according to an embodiment of the present disclosure.

FIG. 11 is a flowchart for illustrating a 360-degree image encoding method according to an embodiment of the present disclosure, and this method will be described with reference to FIG. 12.

The 360-degree image encoding method according to an embodiment of the present disclosure is executed using substantially the same configuration as the 360-degree image encoding apparatus as shown in FIG. 6. Thus, the same reference signs are assigned to the same components as the 360-degree image encoding apparatus of FIG. 6 and will not be described in detail here.

Figure 12:
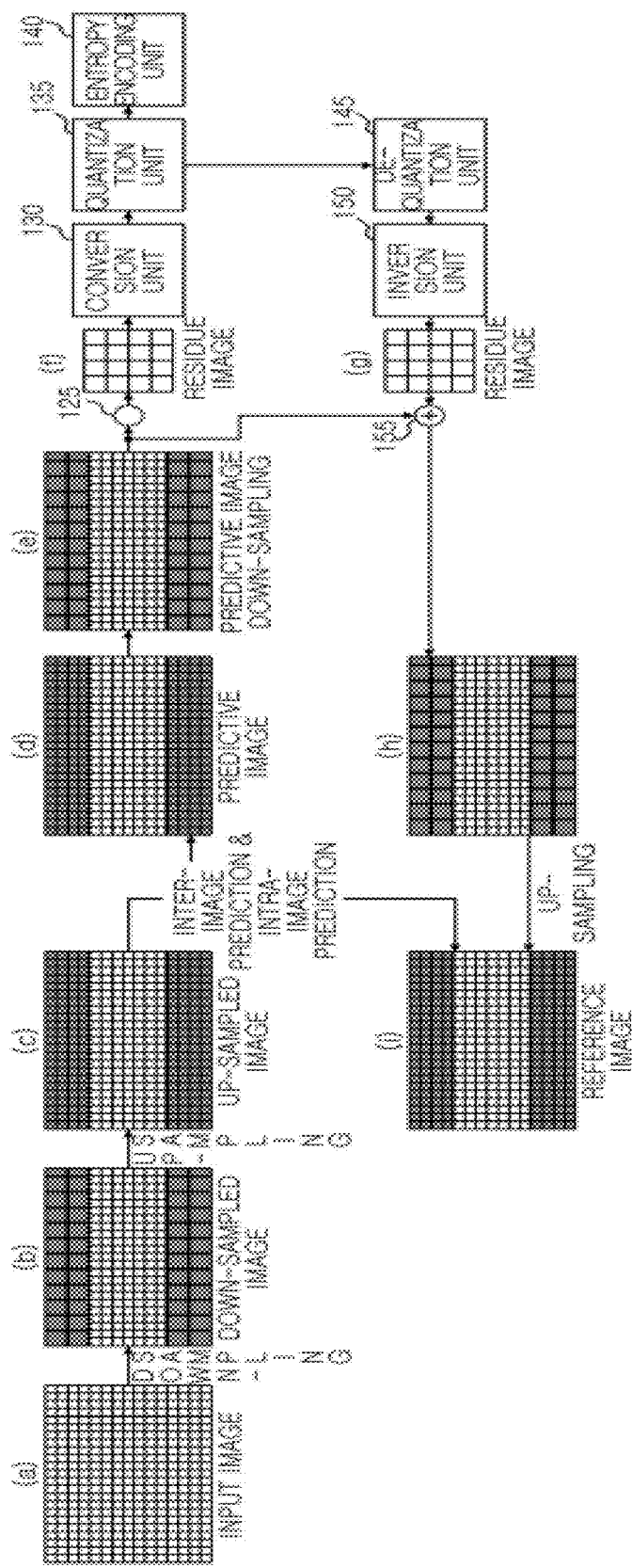
FIG. 12 is a diagram for illustrating the 360-degree image encoding method according to an embodiment of the present disclosure.

First, the image input unit 110 of the 360-degree image encoding apparatus 100 receives a 360-degree image projected in a polar coordinate projection method such as ERP and EAP and developed into a two-dimensional planar image as shown in (A) of FIG. 12 (Step 200).

The 360-degree image received by the image input unit 110 in Step 200 is an image obtained by stitching images taken by a plurality of cameras, and this image is projected using the polar coordinate projection method such as ERP and EAP and developed into a two-dimensional planar image.

The 360-degree image encoding apparatus 100, which receives the 360-degree image developed into a two-dimensional planar image in Step 200, encodes the image input through the image input unit 110. First, the first down-sampling unit 115 divides a current frame, which is an encoding target image, into a 2n+1 number of regions in the vertical direction, maintains a resolution of the middle region located in the middle among the divided regions, and performs down-sampling to remaining regions to lower a resolution thereof as shown in (B) of FIG. 12 (Step 205).

When down-sampling is performed to the remaining region, excluding the middle region, to lower the resolution of the corresponding region in Step 205, the resolution of the input image in the vertical direction, where distortion is not seriously generated, is maintained in the same level as the resolution of the input image in the vertical direction, but for the horizontal direction where distortion is generated more than the vertical direction, the down-sampling is performed to lower the resolution in the horizontal direction.

In Step 205, a down-sampling ratio for the horizontal direction may be differentially determined in consideration of the degree of distortion exhibited in the horizontal direction of each region. When closer to an upper or lower side where the degree of distortion is greater, namely as the vertical angle is closer to +/−90 degrees, the down-sampling ratio may be determined to be a larger value.

After the first down-sampling unit 115 performs down-sampling as in (B) of FIG. 12 in Step 205, the first up-sampling unit 120 performs up-sampling again to the current frame image, obtained by down-sampling the remaining region excluding the middle region in Step 205, to raise the resolution as in (C) of FIG. 12 in order to generate a predictive image using the image down-sampled in Step 205 (Step 210).

In Step 210, the first up-sampling unit 120 performs up-sampling at a predetermined up-sampling ratio to the remaining region, excluding the middle region, of the current frame image applied from the first down-sampling unit 115, thereby raising the resolution of each remaining region to the same level as the middle region.

In Step 210, the first up-sampling unit 120 preferably performs up-sampling the resolution of each region according to an up-sampling ratio, which is set reversely to the down-sampling ratio set for each divided region to the first down-sampling unit 115.

If the current frame image is up-sampled as shown in (C) of FIG. 12 in Step 210, the prediction unit 170 generates a predictive image for the current frame image as shown in (D) of FIG. 12 by using the reference frame image stored in the memory unit 165 and the current frame image applied from the first up-sampling unit 120 (Step 215).

In Step 215, the prediction unit 170 may generate a predictive image for the current frame image by performing inter-image prediction for generating a predictive image in the current frame image with reference to at least one previous or subsequent frame image. It might also perform an intra-image prediction for generating a predictive image by using pixels of restored images previously encoded and decoded in the current frame image.

After that, the second down-sampling unit 175 divides the predictive image generated by the prediction unit 170 in Step 215 into a 2n+1 number (for example, 3, 5, 7, etc.) of regions in the vertical direction, maintains a resolution of a middle region located in the middle among the divided regions, and performs down-sampling to remaining regions, respectively, to lower a resolution thereof as in (E) of FIG. 12 (Step 220).

In Step 220, when performing down-sampling to the remaining region, excluding the middle region, to lower the resolution of the corresponding region, the second down-sampling unit 175 preferably lowers the resolution of each remaining region according to the same down-sampling ratio as the first down-sampling unit 115.

If the second down-sampling unit 175 performs down-sampling to the predictive image in Step 220, the subtraction unit 125 subtracts the predictive image down-sampled by the first down-sampling unit 115 as in (B) of FIG. 12 from the current frame image down-sampled by the second down-sampling unit 175 as in (E) of FIG. 12 to generate a residue image between both images as in (F) of FIG. 12 (Step 225).

After that, the residue image generated in Step 225 is converted from a spatial region into a frequency region, and the data (frequency coefficient) converted into the frequency region is quantized (Step 230).

In addition, the quantized result value calculated in Step 230 is entropy-encoded to generate a bit stream, and the generated bit stream is outputted (Step 235).

Meanwhile, the quantized result value calculated in Step 230 is de-quantized to restore the value (frequency coefficient) of the frequency region, and the value (frequency coefficient) of the restored frequency region is inverted from the frequency region to the spatial region to restore the residue image as in (G) of FIG. 12 (Step 240).

The residue image stored as in (G) of FIG. 12 in Step 240 is added to the predictive image down-sampled by the second down-sampling unit 175 as in (E) of FIG. 12 to generate the restored image as in (H) of FIG. 12 (Step 245).

If the restored image is generated in Step 245, the second up-sampling unit 160 up-samples the restored image generated by the addition unit 155 in Step 245 to raise the resolution as in (I) of FIG. 12 (Step 250).

In Step 250, the second up-sampling unit 160 preferably performs up-sampling at a predetermined up-sampling ratio to each remaining region, excluding the middle region, to raise the resolution of each remaining region to the same level as that of the middle region.

In Step 250, the up-sampled restored image is a reference frame image for the current frame that is an encoding target image.

The 360-degree image encoding method according to an embodiment of the present disclosure may be implemented in the form of an application or program commands executable by various computer components and be recorded on a computer-readable recording medium. The computer-readable recording medium may include program commands, data files, data structures or the like individually or in combination.

The program commands recorded on the computer-readable recording medium may be specially designed or configured for the present disclosure or known and made available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a complier but also high-level language codes executable by a computer by using an interpreter.

While the present disclosure has been described with reference to the embodiments, it will be understood by those skilled in the art that various changes and modifications can be made without departing from the scope of the present disclosure as set forth in the appended claims.

The invention claimed is:

1. An apparatus having one or more processors for encoding a 360-degree image projected to a single plane and developed thereto, the apparatus comprising:
a first down-sampling unit configured to divide a current frame image serving as an encoding target image into 2n+1 number of a plurality of regions in a vertical direction, maintain a resolution of a middle region among the divided plurality of regions, and perform a first down-sampling of each remaining region to lower a resolution of the each remaining region of the current frame image;
a first up-sampling unit configured to perform a first up-sampling of the down-sampled each remaining region to raise the resolution of the each remaining region to a same level as the resolution of the middle region;
a prediction unit configured to generate a predictive image by performing inter-image prediction or intra-image prediction using the first up-sampled current frame image and a reference frame image;
a second down-sampling unit configured to divide the predictive image into 2n+1 number of a plurality of regions in the vertical direction, maintain a resolution of a middle region among the divided plurality of regions, and perform a second down-sampling of each remaining region to lower a resolution of the each remaining region of the predictive image;
a subtraction unit configured to generate a residue image between the current frame image first down-sampled by the first down-sampling unit and the predictive image second down-sampled by the second down-sampling unit;
a conversion unit configured to convert the residue image into a frequency region;
a quantization unit configured to quantize data converted from the frequency region into a quantized result value;
an encoding unit configured to encode the quantized result value;
a de-quantization unit configured to restore a value of the frequency region by de-quantizing the quantized result value quantized by the quantization unit;
an inversion unit configured to restore the residue image by inverting the value of the frequency region restored by the de-quantization unit;
an addition unit configured to generate a restored image of an input image by adding the restored residue image to the predictive image second down-sampled by the second down-sampling unit;
a second up-sampling unit configured to increase the resolution of the each remaining region to the same level as the middle region by performing a second up-sampling of the each remaining region, excluding the middle region, of the restored image generated by the addition unit; and a memory unit configured to store the restored image second up-sampled by the second up-sampling unit as the reference frame image to be used by the prediction unit, wherein the first down-sampling is performed to continuously lower the resolution of the each remaining region of the current frame image in a horizontal direction from the middle region of the current frame, while maintaining the resolution of the each remaining region of the current frame image from each other in the vertical direction.

2. The apparatus of claim 1, wherein when the first down-sampling unit performs the first down-sampling of the each remaining region of the current frame image, a first down-sampling ratio applied to the each remaining region is differentially determined according to a degree of distortion exhibited in the each remaining region in the horizontal direction.

3. The apparatus of claim 1, wherein the first up-sampling unit performs the first up-sampling of the each remaining region of the current frame image according to a first up-sampling ratio that is set inversely to a first down-sampling ratio used when the first down-sampling unit performs the first down-sampling of the each remaining region.

4. The apparatus of claim 1, wherein the second down-sampling unit performs the second down-sampling of the each remaining region of the predictive image according to a second down-sampling ratio identical to a first down-sampling ratio used when the first down-sampling unit performs the first down-sampling of the each remaining region.

5. The apparatus of claim 1, wherein the second up-sampling unit performs the second up-sampling of the each remaining region of the restored image according to a second up-sampling ratio that is set inversely to a first down-sampling ratio used when the first down-sampling unit performs the first down-sampling of the each remaining region.

6. The apparatus of claim 1, wherein a first filter coefficient of a first down-sampling filter used by the first down-sampling unit and a second filter coefficient of a first up-sampling filter used by the first up-sampling unit are included in a video bit stream and transferred to an image decoding device, or are used with preset values according to a mutual promise.

7. A method for encoding a 360-degree image projected to a single plane and developed thereto, the method comprising:

dividing a current frame image serving as an encoding target image into 2n+1 number of a plurality of regions in a vertical direction, maintaining a resolution of a middle region among the divided plurality of regions, and performing a first down-sampling of each remaining region to lower a resolution of the each remaining region of the current frame image;

performing a first up-sampling of the down-sampled each remaining region to raise the resolution of the each remaining region to a same level as the resolution of the middle region;

generating a predictive image by performing inter-image prediction or intra-image prediction using the first up-sampled current frame image and a reference frame image;

dividing the predictive image into 2n+1 number of a plurality of regions in the vertical direction, maintaining a resolution of a middle region among the divided plurality of regions and performing a second down-sampling of each remaining region to lower a resolution of the each remaining region of the predictive image;

generating a residue image between the current frame image first down-sampled in the first down-sampling and the predictive image second down-sampled in the second down-sampling;

converting the residue image into a frequency region;

quantizing data converted from the frequency region into a quantized result value;

encoding the quantized result value; and restoring a value of the frequency region by de-quantizing the quantized result value;

restoring the residue image by inverting the value of the restored frequency region;

generating a restored image of an input image by adding the restored residue image to the predictive image second down-sampled in the second down-sampling;

increasing the resolution of the each remaining region to the same level as the middle region by performing a second up-sampling of the each remaining region, excluding the middle region, of the restored image; and storing the restored image second up-sampled in the second up-sampling as the reference frame image to be used in the prediction.

8. A non-transitory computer readable recording medium having recorded thereon a computer program for executing the 360-degree image encoding method of claim 7.

* * * * *